(12) United States Patent
Livet et al.

(10) Patent No.: US 7,010,329 B2
(45) Date of Patent: Mar. 7, 2006

(54) SYSTEM AND METHOD FOR BATTERY CONSERVATION WITH ASSISTANCE FROM THE NETWORK AND RADIO RESOURCE MANAGEMENT

(75) Inventors: Catherine Livet, Montreal (CA); Guang Lu, Verdun (CA); Shamim Akbar Rahman, Montreal (CA); Maged Zaki, Pierrefonds (CA)

(73) Assignee: InterDigital Technology Corp., Wilmington, DE (US)

( * ) Notice: Subject to any disclaimer, the term of this patent is extended or adjusted under 35 U.S.C. 154(b) by 13 days.

(21) Appl. No.: 10/726,426

(22) Filed: Dec. 3, 2003

(65) Prior Publication Data

US 2004/0180701 A1 Sep. 16, 2004

Related U.S. Application Data

(60) Provisional application No. 60/454,081, filed on Mar. 11, 2003.

(51) Int. Cl.
*H04M 1/00* (2006.01)
(52) U.S. Cl. ............... 455/574; 455/423; 455/425; 455/572
(58) Field of Classification Search ............... 455/574, 455/572–573, 522, 517, 423–425, 550.1, 455/127.1
See application file for complete search history.

(56) References Cited

U.S. PATENT DOCUMENTS

| 6,185,423 | B1 * | 2/2001 | Brown et al. ............... 455/434 |
| 6,459,896 | B1 * | 10/2002 | Liebenow ................... 455/425 |
| 6,584,330 | B1 * | 6/2003 | Ruuska ........................ 455/574 |
| 6,748,245 | B1 * | 6/2004 | Thierry et al. .............. 455/572 |
| 6,792,297 | B1 * | 9/2004 | Cannon et al. ............. 455/573 |
| 2001/0009864 | A1 * | 7/2001 | Seo ............................. 455/574 |
| 2002/0098859 | A1 * | 7/2002 | Murata ....................... 455/522 |
| 2002/0128051 | A1 * | 9/2002 | Liebenow ................... 455/574 |

* cited by examiner

*Primary Examiner*—William Trost
*Assistant Examiner*—Brandon J. Miller
(74) *Attorney, Agent, or Firm*—Volpe and Koenig, PC (57) ABSTRACT

A method for battery conservation in a wireless communication system begins with requesting a battery level measurement from a wireless transmit/receive unit (WTRU) by a radio network controller (RNC). The battery level is measured at the WTRU and is reported to the RNC. The battery level measurement is stored in the RNC, where it can be accessed by radio resource management (RRM) procedures. The battery level measurement is applied to the RRM procedures by making adjustments to the procedures based on the battery level measurement, whereby the battery of the WTRU is conserved.

13 Claims, 8 Drawing Sheets

SYSTEM AND METHOD FOR BATTERY CONSERVATION WITH ASSISTANCE FROM THE NETWORK AND RADIO RESOURCE MANAGEMENT

CROSS REFERENCE TO RELATED APPLICATION(S)

This application claims priority from U.S. Provisional Application No. 60/454,081, filed Mar. 11, 2003, which is incorporated by reference as if fully set forth herein.

FIELD OF INVENTION

The present invention relates generally to wireless transmit/receive unit (WTRU) battery conservation in wireless communications systems, and more particularly, to a method of achieving WTRU battery conservation with assistance from the network and from radio resource management (RRM).

BACKGROUND

It is known that battery life for a WTRU is an important aspect of the quality of service that an end user perceives, and any measure that could achieve battery savings is a desirable accomplishment in wireless communication system design. Some of the existing systems and methods for conserving battery power relate to reducing the power of at least part of the WTRU to conserve battery life. For example, in U.S. Pat. No. 5,539,925, a base station sends a signal to a mobile station to turn off the mobile station for a length of time communicated in the message. At the end of the "off" period, the mobile station will automatically restart itself to determine whether it needs to remain active or whether it can be turned off for an additional period.

U.S. Pat. No. 6,463,042 relates to a method in which a wireless terminal receives a header packet and estimates the power level of the header packet. The wireless terminal then receives a portion of a following data packet, and estimates the power level of the data packet. A comparison is made between the power level of the header packet and the power level of the data packet. If the power levels are approximately equal, then the wireless terminal will receive and process the remainder of the data packet. If the power level of the header packet is greater than the power level of the data packet, then this is an indication that the base station is operating in quasi-discontinuous transmission (Q-DTX) mode and that the wireless terminal can ignore the remainder of the data packet and put some of the components into a low power mode.

In U.S. Pat. No. 6,463,307, a hibernation request is made by either the base station or the mobile terminal. Parameters relating to the hibernation period, including when to wake the mobile terminal to check for paging messages or whether the mobile terminal has a data packet to send, are then set by the base station and transmitted to the mobile terminal. Once the hibernating period has ended, if there are any waiting paging messages, the mobile terminal is awakened and the paging messages are checked. If there are no paging messages, then a determination is made whether the mobile terminal has any pending data packets to send. If there are pending data packets, then the mobile terminal is awakened and the packets are sent. If there are no pending packets, then the mobile terminal returns to the hibernation mode.

The systems and methods described above relate only to the powering-down of components to conserve battery power, and not to methods for conserving battery power while the WTRU is actively transmitting. It would, therefore, be desirable to achieve battery savings when the WTRU is active.

SUMMARY

The present invention enables the radio resource management (RRM) in the radio network side to reduce wireless transmit/receive unit (WTRU) battery consumption. The WTRU reports its battery level information to the network. The RRM in the network can then make informed decisions to maximize the battery life of the WTRU while still maintaining the required quality of service (QoS) and system capacity. Based on reported battery levels, different RRM actions can be taken relating to call admission control, congestion control, user link maintenance, handover, power control, block error rate (BLER) target, and application configuration. The invention is described making reference to a universal mobile telecommunication system (UMTS) frequency-division duplex (FDD)/time-division duplex (TDD) system, but is applicable to any wireless system, including IEEE 802.11 and global system for mobile communications (GSM).

A method for battery conservation in a wireless communication system in accordance with the present invention begins with requesting a battery level measurement from a wireless transmit/receive unit (WTRU) by a radio network controller (RNC). The battery level is measured at the WTRU and is reported to the RNC. The battery level measurement is stored in the RNC, where it can be accessed by RRM procedures. The battery level measurement is applied to the RRM procedures by making adjustments to the procedures based on the battery level measurement, whereby the battery of the WTRU is conserved.

BRIEF DESCRIPTION OF THE DRAWINGS

A more detailed understanding of the invention may be had from the following description of a preferred embodiment, given by way of example and to be understood in conjunction with the accompanying drawings wherein.

DETAILED DESCRIPTION OF A PREFERRED EMBODIMENT

An implementation of the invention is described in the following preferred embodiment, which is applicable to a UMTS (FDD/TDD) system. The invention is, however, applicable to any wireless system including, e.g., IEEE 802.11 and GSM. Hereafter a WTRU includes, but is not limited to, a user equipment, a mobile station, a fixed or mobile subscriber unit, a pager, or any other type of device capable of operating in a wireless environment. When referred to hereafter, a base station includes, but is not limited to, a base station, a Node-B, a site controller, an access point, or other interfacing device in a wireless environment.

Figure 1:
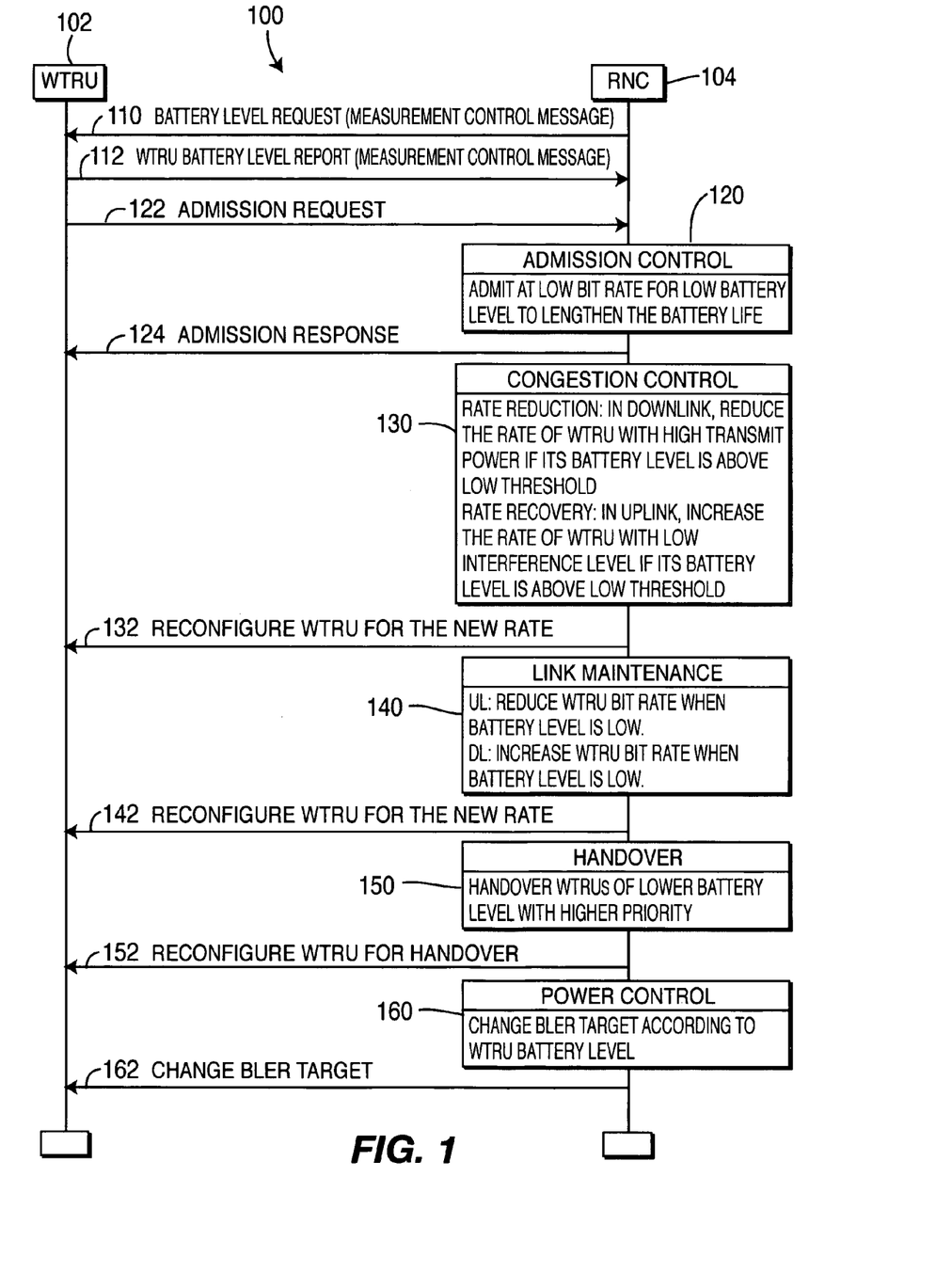
FIG. 1 illustrates radio network controller (RNC) RRM actions according to WTRU battery level.

FIG. 1 shows the exchange of information in a UMTS system 100, including a WTRU 102 and an RNC 104. The WTRU 102 reports its battery level to the network as follows. The RNC 104 requests the WTRU 102 to report the battery level measurement by sending a Measurement Control Message 110 in the downlink. In the message 110, the RNC 104 configures the WTRU 102 with the measurement reporting criteria, such as the frequency of reporting for periodic-based reporting or the threshold for threshold-based reporting. The WTRU 102 reports its battery level by sending a Measurement Report Message 112 according to the reporting criteria dictated by the RNC 104. In order to conserve battery power, the report message 112 can be transmitted along with other measurements. For example, in UMTS networks, the battery level can be reported in a manner similar to any other measurement (i.e., via radio resource control (RRC) signaling).

The information contained in the report message 112 can include the number of remaining minutes of talk time and the number of remaining minutes of idle time. This number can be either an instantaneous value based on the current transmission environment and current type of service (e.g., voice or data), or an average value based on the conditions for the last X minutes. Alternatively, the reported battery level can be the percentage of available battery power remaining. The WTRU 102 can be set to send the report message 112 periodically, or to send the report message 112 when a threshold is reached. The periodic reporting can range from one second to ten minutes, with a preferred default value of one minute. For the threshold based reporting, the WTRU may take frequent measurements, but will only send a measurement report to the RNC when a certain threshold is crossed. The types of evaluated thresholds include low, medium, and high thresholds, and will be explained in detail below.

The RRM in the RNC 104 makes informed decisions based on the reported battery level of the WTRU 102. In general, the measurements used by the RRM to make a decision are those typically used in the art in connection with each type of decision, with the battery level of the WTRU 102 being used as an additional criterion. Some of the other measurements used by the RRM include downlink interference signal code power (ISCP), received signal code power (RSCP), and pathloss.

The procedures affected by the battery level measurement will be discussed in greater detail below. Viewed as a signal exchange between the WTRU 102 and the RNC 104, the admission control procedure 120 is triggered by an admission request 122 sent by the WTRU 102. The admission control 120 indicates whether a call has been admitted by sending an admission response 124. A congestion control procedure 130 will configure the WTRU 102 for a new transmission rate by sending a signal 132. A link maintenance procedure 140 will configure the WTRU 102 for a new transmission rate by sending a signal 142. A handover procedure 150 will configure the WTRU 102 for handover by sending a signal 152. A power control procedure 160 will change the BLER target of the WTRU 102 by sending a signal 162.

Figure 2:
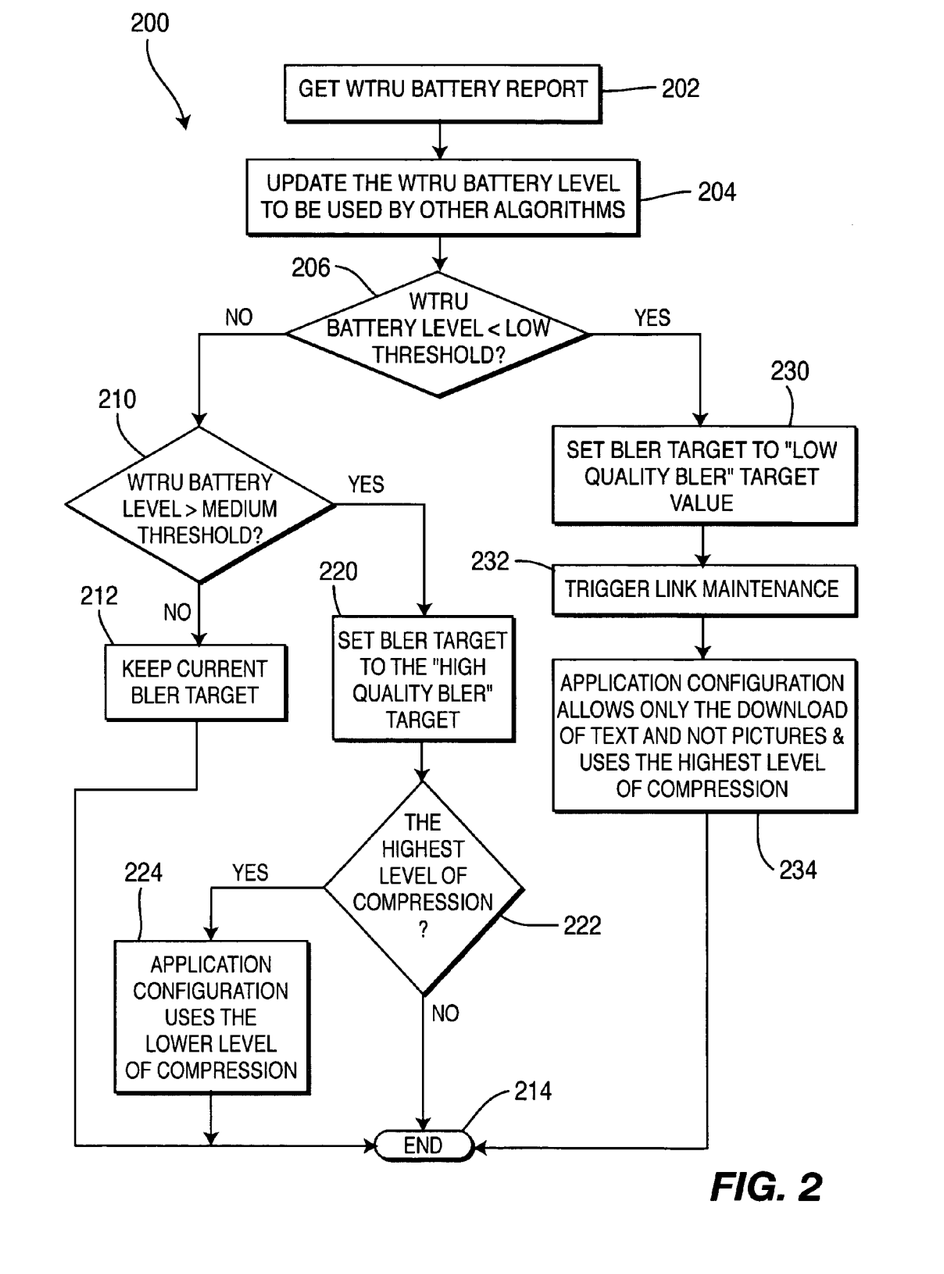
FIG. 2 is a flow chart of the RNC RRM behavior upon receiving the WTRU battery level.

FIG. 2 describes the RRM behavior 200 in the RNC 104 upon receiving the battery level report message 112 from the WTRU 102. The RRM in the RNC 104 first receives the WTRU battery measurement report message 112 (step 202).

The RNC RRM then updates the WTRU battery level parameter and stores it in a database (step 204). All other procedures have access to this parameter, since the procedure behavior changes according to the WTRU battery level as explained in connection with each procedure below. Three battery level thresholds are used as triggers: low, medium, and high. These thresholds are the same as those mentioned above in connection with the threshold-based battery level reporting. It should be understood by those of skill in the art that the specific battery levels and thresholds are design parameters that will vary with each implementation. Accordingly, these specific levels and thresholds will not be described hereinafter.

The WTRU battery level is checked to determine if it is below the low threshold (step 206). If the battery level above the low threshold, then the WTRU battery level is checked (step 210) to determine if it is above the medium threshold. The higher the BLER target is, the higher the transmission power that is needed and the battery will be drained faster. Therefore, it is desirable to adjust the BLER target based on the current battery level. If the battery level is below the medium threshold, the current BLER target is maintained (step 212), and the procedure is terminated (step 214).

If the battery level is above the medium threshold (step 210), the BLER target is set to the "high quality BLER" target (step 220). Next, the current level of compression is evaluated (step 222). If the current level of compression is the highest level of compression, then switch to the lower level of compression (step 224) and terminate the procedure (step 214). Otherwise, maintain the current compression level and terminate the procedure (step 214).

If the WTRU battery level is below the low threshold (step 206), then the BLER target is set to the "low quality BLER" target (step 230) to extend the battery life. Next, link maintenance is triggered (step 232) to reduce the battery consumption rate, as explained below. The application configuration and the compression level are adjusted (step 234) to conserve battery power, as explained below. The procedure then terminates (step 214).

Call Admission Control

Figure 3:
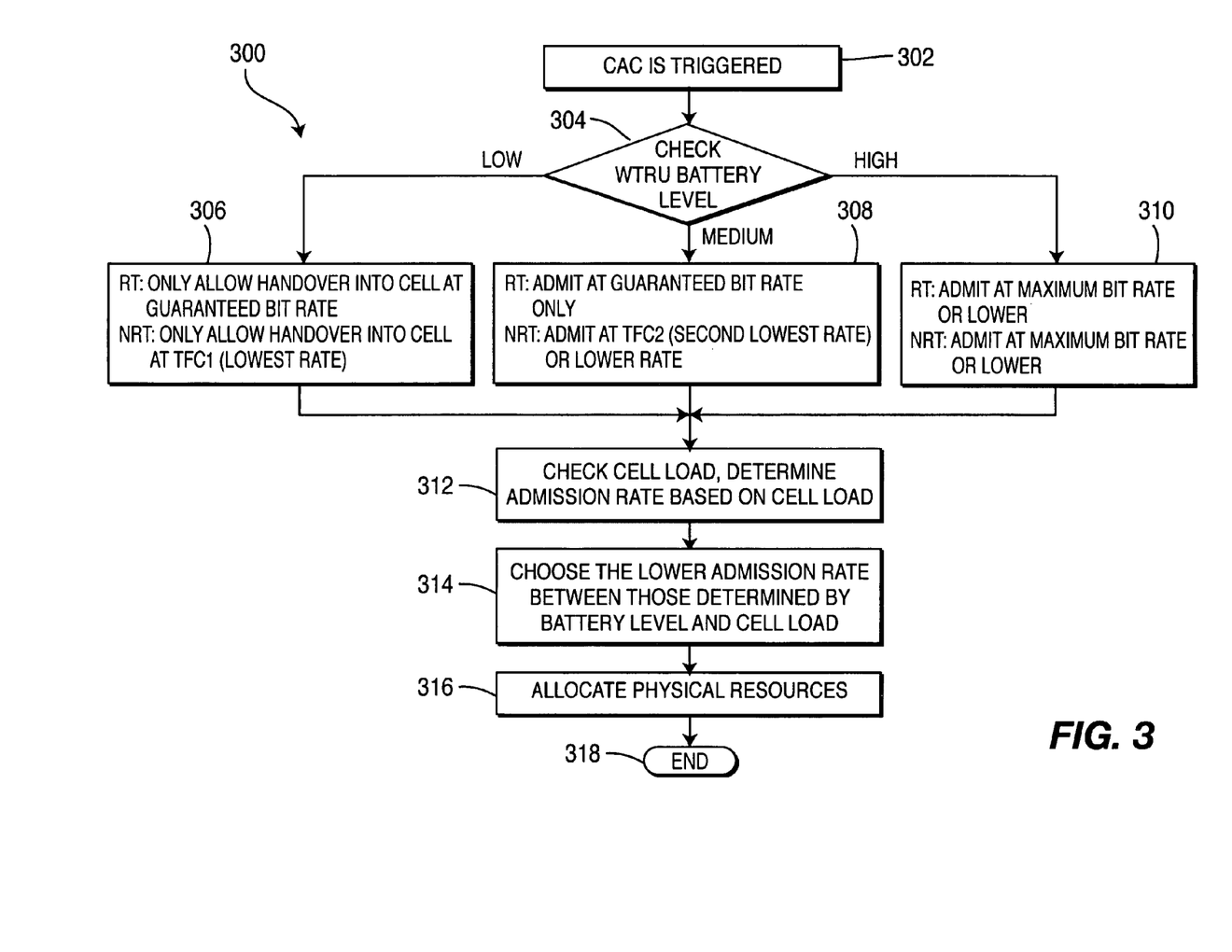
FIG. 3 is a flowchart of a call admission control procedure incorporating checking the WTRU battery level.

Referring now to FIG. 3, the Call Admission Control (CAC) procedure 300 begins by triggering CAC (step 302), which is done when the WTRU 102 requests call admission from the RNC 104 (signal 122 in FIG. 1). Then the WTRU's battery level is checked (step 304). The next step taken by the CAC procedure 300 depends directly upon the battery level and whether the current call is real time (shown as "RT" in FIG. 3) or non-real time (shown as "NRT" in FIG. 3).

If the battery level is low, CAC will only allow handover into a cell at the guaranteed bit rate for real time calls, and will only allow handover into the cell at the lowest bit rate (TFC1) for non-real time calls (step 306). If the battery level is medium, CAC will only admit calls at the guaranteed bit rate for real time calls, and will admit at TFC2 (the second lowest bit rate) or a lower bit rate for non-real time calls(step 308). If the battery level is high, for both real time and non-real time calls, CAC will admit the call at the maximum bit rate or lower (step 310). The CAC behavior according to the battery level is summarized in the following table.

TABLE 1

CAC behavior according to battery level.

| Battery level | CAC behavior (real time services) | CAC behavior (non-real time services) |
|---|---|---|
| 1. Low | Only allow handover into the cell and consider the guaranteed bit rate for the admission decision and physical resource assignment. No other types of accesses are admitted. | Only allow handover into the cell and consider TFC1 (lowest rate) for admission decision for handover. Assign physical resources based on the accepted bit rate. No other types of accesses are admitted. |
| 2. Medium | Consider the guaranteed bit rate only for the admission decision and assign physical resources based on the guaranteed bit rate. | Consider TFC2 (second lowest rate) or lower for admission decisions. Assign physical resources based on the accepted bit rate. (Where TFC4 bit rate > TFC3 bit rate > TFC2 bit rate > TFC1 bit rate > 0.) |
| 3. High | Consider the maximum bit rate and below for the admission decision and assign physical resources based on the accepted bit rate. | Consider the maximum bit rate and below for the admission decision and assign physical resources based on the accepted bit rate. |

After the bit rate determination has been made according to the current WTRU battery level (steps 306, 308, or 310), the CAC procedure 300 proceeds to step 312, where the cell load is checked to determine the allowable call admission bit rate. The accepted bit rate for the call is chosen by selecting the lower admission rate as determined by the battery level and the cell load (step 314). Lastly, the physical resources required for the call are allocated (step 316) and the procedure terminates (step 318).

Besides the traditional criteria used to decide whether or not to admit the user and the bit rate for admission (e.g., interference, carrier power, cell load), the RNC 104 also adjusts the assigned bit rate depending on the WTRU battery level. The criteria that are evaluated for CAC depend on the procedure design and can vary, per known CAC procedures.

Also, code fragmentation in TDD is minimized for WTRUs with a low battery level. There are usually multiple solutions to assign the Orthogonal Variable Spreading Factor (OVSF) codes required by a call, in terms of the number of timeslots used and which codes to use in the tree. The fewer timeslots that are used, the lower the code fragmentation is. To minimize code fragmentation, the RNC RRM should allocate the codes in as few timeslots as possible. This reduces the possibility that the WTRU 102 raises its power level when it is far from the base station. Once the call has been admitted, the RNC 104 sends a response message to the WTRU (signal 124 in FIG. 1).

Congestion Control

Figure 4:
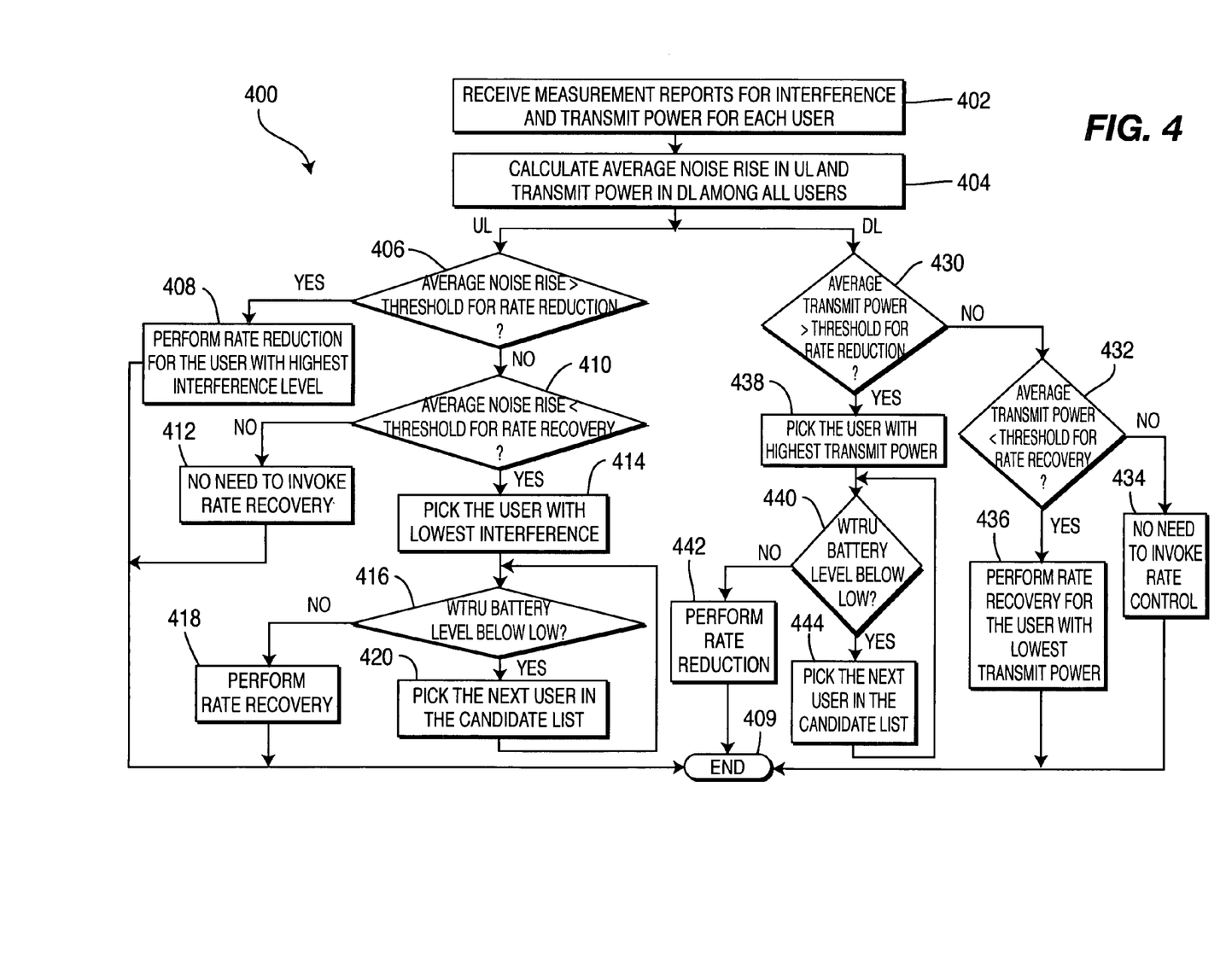
FIG. 4 is a flowchart of a congestion control procedure incorporating checking the WTRU battery level.

Congestion control performs rate reduction and rate recovery in both the uplink and the downlink. For the present invention, the WTRU's battery level is considered when performing rate recovery in the uplink and rate reduction in the downlink. FIG. 4 shows a flow chart of a congestion control procedure 400 in accordance with the present invention. It is noted that the criteria used in the congestion control procedure 400 depend upon the design of the procedure. FIG. 4 shows a slow congestion control procedure, which uses the average noise rise in the uplink and the average transmit power in the downlink as criteria to decide whether or not to trigger rate control. It is to be understood that the slow congestion control procedure is only an example, and that the present invention is equally applicable to any congestion control procedure.

Referring now to FIG. 4, the congestion control procedure 400 begins by receiving measurement reports for interference and transmission power for each user (step 402). Next, the average noise rise in the uplink and the transmit power in the downlink are calculated for all users (step 404). These measurements are stored at the RNC, and are used several times during this procedure. When evaluating the uplink, a determination is made whether the average noise rise exceeds the threshold for rate reduction (step 406). If the average noise rise is above the rate reduction threshold, then rate reduction is performed for the user with the highest interference level (step 408) and the procedure terminates (step 409).

If the average noise rise is below the rate reduction threshold (step 406), a separate determination is made comparing the average noise rise to the threshold for rate recovery (step 410). If the average noise rise is above the rate recovery threshold, then there is no need to invoke rate recovery (step 412) and the procedure terminates (step 409). If the average noise rise is below the rate recovery threshold, then the user with the lowest measured interference is selected (step 414). As noted above, the interference is measured for all users in step 402, and can be sorted either in step 402 or step 414. Next, the selected user's WTRU battery level is checked to determine whether it is below the low battery level (step 416). If the battery level is above the low level, then rate recovery is performed for the selected user (step 418) and the procedure terminates (step 409). If the battery level is below the low level, then the next user in the candidate list for rate recovery is selected (step 420) and step 416 is repeated.

On the downlink, the average transmit power is compared to the threshold for rate reduction (step 430). If the average transmit power is below the rate reduction threshold, a separate determination is made comparing the average transmit power to the threshold for rate recovery (step 432). If the average transmit power is above the rate recovery threshold, then there is no need to invoke rate control (step 434) and the procedure terminates (step 409). If the average transmit power is below the rate recovery threshold, then rate recovery is performed for the user with the lowest transmit power (step 436) and the procedure terminates (step 409). As noted above, the transmission power for each user is stored in step 402, and can be sorted either in step 402 or step 436.

If the average transmit power is above the rate reduction threshold (step 430), then the user with the highest transmit power is selected (step 438). Next, the selected user's WTRU battery level is checked to determine whether it is below the low battery level (step 440). If the battery level is above the low level, then rate reduction is performed for the selected user (step 442) and the procedure terminates (step 409). If the battery level is below the low level, then the next user in the candidate list for rate reduction is selected (step 444) and step 440 is repeated.

In the procedure 400 on the uplink, if the RNC 104 has detected that the congestion situation has been relieved (the average noise rise is lower than the threshold for rate recovery), the RNC 104 uses the battery level of the WTRU 102 as an additional criterion. Increasing the uplink transmission rate drains the battery faster, because a higher transmission rate uses more power than a lower transmission rate. The congestion control ranks the WTRUs 102 according to their interference level from low interference to high interference. The congestion control then selects the WTRU 102 with the lowest interference level. If the selected WTRU's battery level is below the low threshold, the congestion control should pick the next WTRU 102 in the candidate list. If the battery level of the WTRU 102 is greater than the low level, then rate recovery can be performed.

In the procedure 400 on the downlink, the RNC 104 detects congestion based on the average value of recently received measurements. Once congestion is detected (the average transmit power is greater than the threshold for rate reduction), the RNC 104 chooses the user with highest transmit power for rate reduction. Decreasing the downlink receiving bit rate drains the battery faster because the WTRU 102 requires additional time to receive the same amount of data. Therefore, the RNC 104 uses the battery level of the WTRU 102 as an additional criterion for deciding whether to implement rate reduction. If the selected WTRU's battery level is below the low threshold, the congestion control should pick the next WTRU 102 in the candidate list. Otherwise, rate reduction can be performed for the selected WTRU. If the average transmit power is lower than the threshold for rate recovery, rate recovery should be conducted. Increasing the downlink receiving bit rate reduces the time for WTRU 102 to receive the same amount of data, thus extending battery life. Therefore, WTRU 102 battery level is not a criterion for rate recovery in the downlink.

Once the rate reduction or rate recovery is performed at the RNC 104, the RNC 104 reconfigures the WTRU 102 for the new rate (signal 132 in FIG. 1).

User Link Maintenance

Figure 5A:
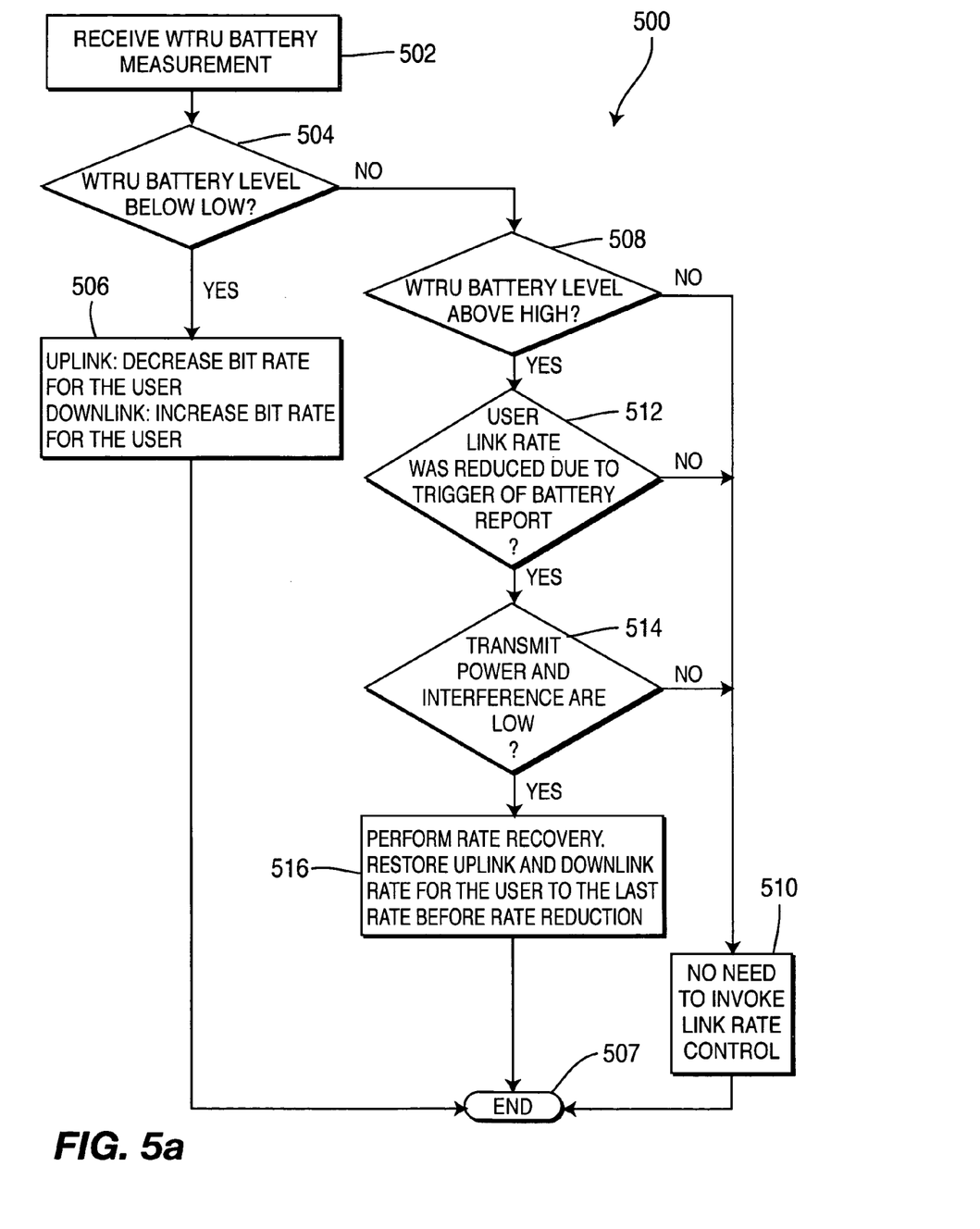
FIGS. 5a–5c are flowcharts of user link maintenance procedures incorporating checking the WTRU battery level.
Figure 5B:
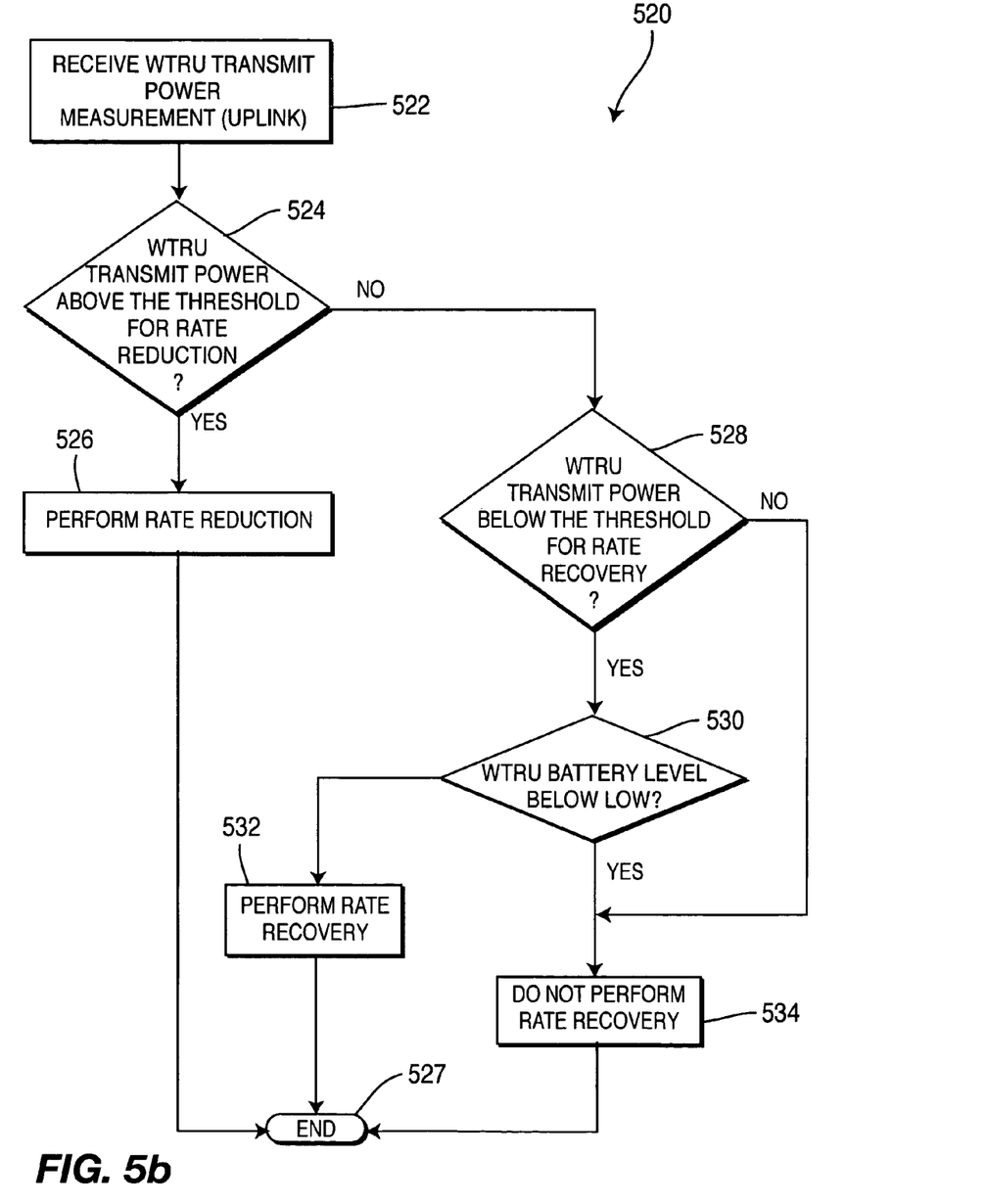
Figure 5C:
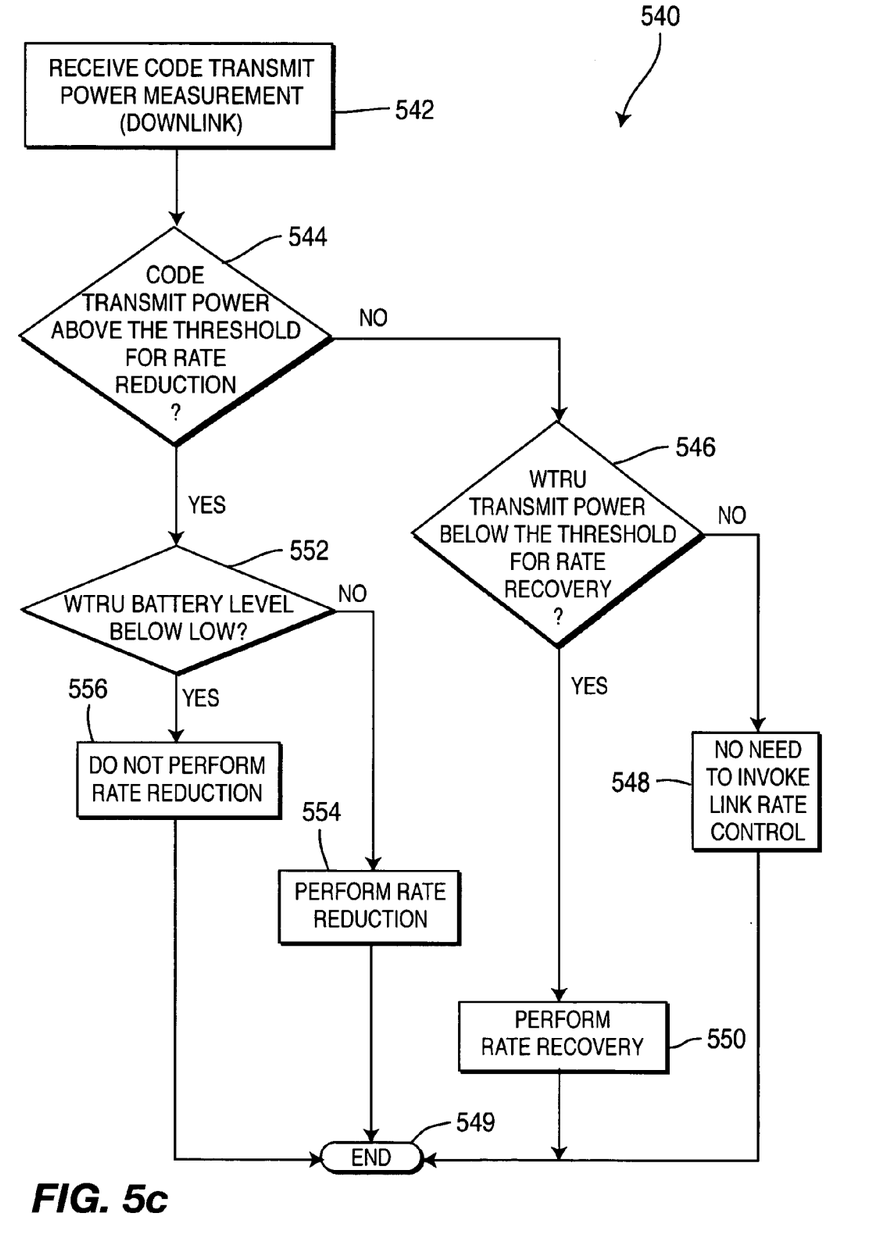

Referring now to FIGS. 5a–5c, the user link maintenance procedure can be triggered by three different events: (1) upon receipt of a battery level measurement report at the RNC, (2) upon receipt of the WTRU transmit power measurement on the uplink, and (3) upon receipt of the code transmit power measurement on the downlink.

FIG. 5a shows a user link maintenance procedure 500 that is performed upon receipt of a battery level measurement report (step 502). A determination is made whether the WTRU battery level is below the low level (step 504). If the battery level is below the low level, then the user's bit rate is decreased if operating in the uplink and the bit rate is increased if operating in the downlink (step 506) and the procedure terminates (step 507).

If the battery level is above the low level (step 504), then a separate determination is made whether the battery level is above the high level (step 508). If the battery level is below the high level, then there is no need to invoke link rate control (step 510) and the procedure terminates (step 507). If the battery level is above the high level, then a separate determination is made whether the user link rate was reduced by another rate reduction procedure due to the triggering of a battery level measurement report (step 512). If the link rate was not previously reduced, then there is no need to invoke link rate control (step 510) and the procedure terminates (step 507). If the link rate was previously reduced, then a determination is made whether the transmission power and the measured interference are low (step 514). If both the transmission power and the measured interference are not low, then there is no need to invoke link rate control (step 510) and the procedure terminates (step 507). If both the transmission power and the measured interference are low, then rate recovery is performed, in which the uplink and downlink rates for the user are restored to the last rates used before the rate reduction (step 516) and the procedure terminates (step 507).

FIG. 5b shows a user link maintenance procedure 520 that is performed upon receipt of the WTRU transmit power in the uplink (step 522). The WTRU transmit power is checked to determine if it is above the threshold for rate reduction (step 524). If the transmit power is above the rate reduction threshold, then rate reduction is performed (step 526) and the procedure terminates (step 527). If the transmit power is below the rate reduction threshold (step 524), then a separate determination is made whether the WTRU transmit power is below the threshold for rate recovery (step 528). If the transmit power is below the rate recovery threshold, then another determination is made whether the WTRU battery level is below the low level (step 530). If the battery level is above the low level, then rate recovery is performed (step 532) and the procedure terminates (step 527). If the battery level is below the low level, then rate recovery is not performed (step 534) and the procedure terminates (step 527). If the transmission power is above the threshold for rate recovery (step 528), then rate recovery is not performed (step 534) and the procedure terminates (step 527).

FIG. 5c shows a user link maintenance procedure 540 that is performed upon receipt of the code transmit power measurement in the downlink (step 542). The code transmit power is checked to determine if it is above the threshold for rate reduction (step 544). If the code transmit power is below the rate reduction threshold, a determination is made whether the code transmit power is below the threshold for rate recovery (step 546). If the code transmit power is above the rate recovery threshold, then there is no need to invoke link rate control (step 548) and the procedure terminates (step 549). If the code transmit power is above the rate recovery threshold, then rate recovery is performed (step 550) and the procedure terminates (step 549).

If the code transmit power is above the rate reduction threshold (step 544), then the WTRU battery level is checked to determine if it is below the low level (step 552). If the battery level is above the low level, then rate reduction is performed (step 554) and the procedure terminates (step 549). If the battery level is below the low level, then rate reduction is not performed (step 556) and the procedure terminates (step 549).

The WTRU battery measurement report can be a trigger of the user link maintenance procedure. If the RNC 104 receives a battery report message 112 indicating a low battery level, the WTRU bit rate in the uplink is decreased to reduce the battery consumption rate, which is especially useful for long calls. The RNC 104 configures the WTRU 102 for a lower bit rate (signal 142 in FIG. 1). In the downlink, the RNC 104 increases the bit rate transmitting to the WTRU 102, thus shortening the power-on time of the WTRU 102. If the RNC 104 receives a battery report message 112 indicating a battery level above the low level, and if the bit rate was reduced before due to low battery, the link rate in uplink and downlink will be restored to the previous rate before the last rate reduction.

In the downlink, if user link maintenance is triggered by another measurement, for example, by code transmit power, the RNC 104 uses the battery level of the WTRU 102 as an additional criterion for rate reduction. The criteria used depends on the design of the link maintenance control procedure 500, 520, 540. Different approaches in performing link maintenance control may use different criteria. For example, the link maintenance control procedures described above use uplink WTRU transmit power and downlink code transmit power. If the WTRU's battery level is below the low threshold, decreasing the downlink receiving bit rate increases the time for the WTRU 102 to receive the same amount of data, thus draining the WTRU 102 battery faster. Therefore, the link maintenance should not decrease the receiving bit rate for the WTRU 102.

In the uplink, if the user link maintenance is triggered by another measurement, for example, by the WTRU transmit power, the RNC 104 uses the battery level of the WTRU 102 as an additional criterion for rate recovery. If the WTRU's battery level is below the low threshold, increasing the uplink transmission bit rate drains the battery faster. Thus, the link maintenance should not increase the transmission bit rate for the WTRU 102.

Handover

Figure 6:
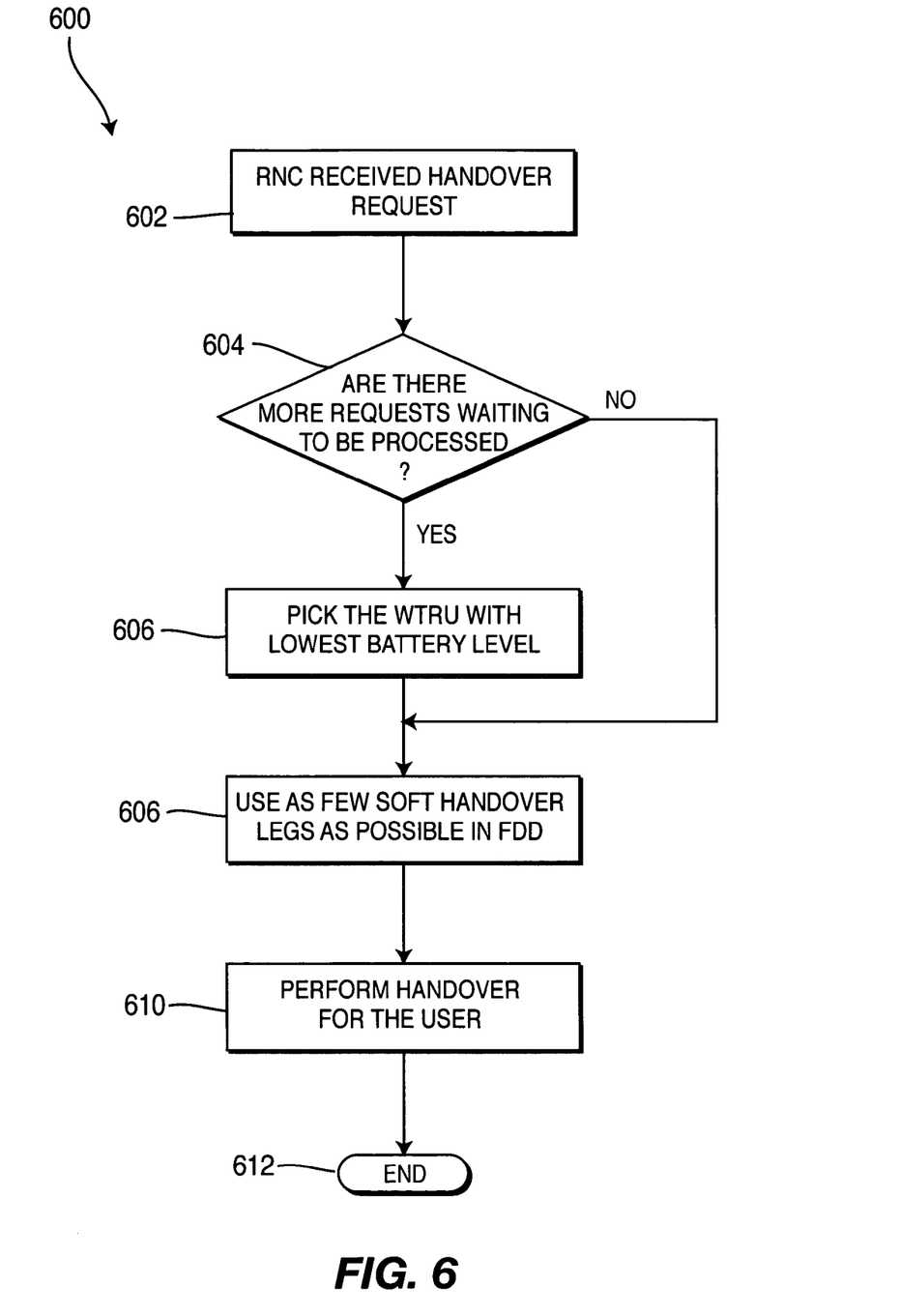
FIG. 6 is a flowchart of a handover procedure incorporating checking the WTRU battery level.

FIG. 6 shows a handover procedure 600 in accordance with the present invention. The RNC first receives a handover request (step 602) and then checks if there are additional handover requests waiting to be processed (step 604). If there are additional handover requests, the WTRU with the lowest battery level is selected (step 606). Next, the number of soft handover legs are determined, and the number is kept as low as possible when operating in FDD (step 608). If, at step 604, there are no additional requests, step 606 is skipped, and the procedure continues with step 608. Lastly, the handover is performed (step 610) and the procedure terminates (step 612).

A higher priority for handover is given to a WTRU 102 with a low battery level (signal 152 in FIG. 1). The battery level can be used to decide the number of soft handover legs for FDD, where the lower the battery level, the fewer the number of handover legs that should be assigned. In FDD, the WTRU 102 can have simultaneous radio link connections (soft handover legs) in different cells. The more handover legs that are established, the faster the WTRU's battery will be consumed due to the extra processing needed for the extra handover legs.

Power Control

The BLER target is changed according to the WTRU battery level. At call admission, the RNC RRM checks the service and determines the BLER target based upon the service type. The service type is the quality of service class, for example, conversational, streaming, interactive/background, signaling AM/UM, or other service type. For each service type, there are two possible BLER targets for the RNC RRM when considering WTRU battery level.

The first possible BLER target is the "low quality BLER," which is the minimum BLER acceptable by the network and can be used by the WTRU 102 when its battery level is below the low threshold. The second possible BLER target is the "high quality BLER," which is better than the low quality BLER and can be used by the WTRU 102 when its battery level is above the medium threshold. A WTRU needs to transmit with higher power in order to meet a high quality BLER target, so the battery needs to have sufficient power to prevent a rapid depletion.

During a call, the power control is triggered based on the WTRU battery level (signal 162 in FIG. 1). An example of the numerical values both of the BLER target for several different service types is shown in Table 2. These values should be operations, administration, and maintenance (OA&M) configurable. The power control procedure can be triggered by the battery level measurement report, as shown in steps 220 and 230 of FIG. 2.

TABLE 2

BLER target for different battery levels.

| Traffic Class | Uplink BLER | | Downlink BLER | |
|---|---|---|---|---|
| | Low Quality | High Quality | Low Quality | High Quality |
| Conversational | $10^{-2}$ | $5 \times 10^{-2}$ | $10^{-2}$ | $5 \times 10^{-2}$ |
| Streaming | $10^{-2}$ | $5 \times 10^{-2}$ | $10^{-2}$ | $5 \times 10^{-2}$ |
| Interactive/Background | $10^{-3}$ | $5 \times 10^{-3}$ | $10^{-3}$ | $5 \times 10^{-3}$ |
| Signaling AM/UM | $10^{-3}$ | $5 \times 10^{-3}$ | $10^{-3}$ | $5 \times 10^{-3}$ |

Application Configuration

For non-real time (NRT) calls, compression layers can be configured to provide multiple levels of coding compression. Application configuration uses the battery level of the WTRU 102 as the only criterion to determine the compression level. The lower the battery level, the higher the level of compression that will be configured. At the application level, i.e., outside the UMTS terrestrial radio access network (UTRAN), the application can be optimized to provide different levels of information. For example, in the case of a low battery level during Web browsing, the application can be configured to only allow the download of text and not pictures. The battery level measurement report can trigger the application configuration procedure as described above in connection with steps 224 and 234 of FIG. 2.

While this invention has been particularly shown and described with reference to preferred embodiments, it will be understood by those skilled in the art that various changes in form and details may be made without departing from the scope of the invention as described hereinabove.

What is claimed is:

1. A method for battery conservation in a wireless communication system having a wireless transmit/receive unit (WTRU) and a radio network controller (RNC), the method comprising the steps of:

requesting a battery level measurement from the WTRU by the RNC;

measuring the battery level at the WTRU;

reporting the battery level measurement from the WTRU to the RNC;

storing the battery level measurement in the RNC;

accessing the battery level measurement by radio resource management (RRM) procedures in the RNC; and applying the battery level measurement to the RRM procedures, whereby the battery of the WTRU is conserved due to adjustments made to the procedures based on the battery level measurement.

2. The method according to claim 1, wherein said requesting step includes sending a measurement control message from the RNC to the WTRU.

3. The method according to claim 2, wherein the measurement control message includes measurement reporting criteria.

4. The method according to claim 1, wherein said reporting step includes sending a measurement report message from the WTRU to the RNC.

5. The method according to claim 4, wherein the measurement report message includes the number of remaining minutes of talk time and the number of remaining minutes of idle time.

6. The method according to claim 4, wherein the measurement report message includes the percentage of available battery power remaining.

7. A system for battery conservation in a wireless communication system having a wireless transmit/receive unit (WTRU) and a radio network controller (RNC), comprising:
   requesting means for requesting a battery level measurement from the WTRU by the RNC;
   measuring means for measuring the battery level at the WTRU;
   reporting means for reporting the battery level measurement from the WTRU to the RNC;
   storing means for storing the battery level measurement;
   accessing means for accessing the battery level measurement by radio resource management (RRM) procedures in the RNC; and
   applying means for applying the battery level measurement to the RRM procedures, whereby the battery of the WTRU is conserved due to adjustments made to the procedures based on the battery level measurement.

8. The system according to claim 7, wherein said requesting means includes a measurement control message sent from the RNC to the WTRU.

9. The system according to claim 8, wherein said measurement control message includes measurement reporting criteria.

10. The system according to claim 7, wherein said reporting means includes a measurement report message sent from the WTRU to the RNC.

11. The system according to claim 10, wherein said measurement report message includes the number of remaining minutes of talk time and the number of remaining minutes of idle time.

12. The system according to claim 10, wherein said measurement report message includes the percentage of available battery power remaining.

13. The system according to claim 7 wherein said storing means includes a database in the RNC.

* * * * *

UNITED STATES PATENT AND TRADEMARK OFFICE
CERTIFICATE OF CORRECTION

| | | |
|---|---|---|
| PATENT NO. | : 7,010,329 B2 | Page 1 of 1 |
| APPLICATION NO. | : 10/726426 | |
| DATED | : March 7, 2006 | |
| INVENTOR(S) | : Livet et al. | |

It is certified that error appears in the above-identified patent and that said Letters Patent is hereby corrected as shown below:

On the title page:

Item (56), U.S. PATENT DOCUMENTS, page 1, right column, before line 1, insert -- 6,029,074  2/2000  Irvin  455/571--.

Item (56), U.S. PATENT DOCUMENTS, page 1, right column, after line 7, insert -- 2002/0094849  7/2002  Cannon et al.  455/573--.

Item (56), page 1, right column, after U.S. PATENT DOCUMENTS, insert --FOREIGN PATENT DOCUMENTS, WO  99/17462  04/1999 Thierry--.

At column 4, line 16, after the word "level", insert --is--.

Signed and Sealed this

Twenty-fourth Day of April, 2007

JON W. DUDAS
*Director of the United States Patent and Trademark Office*